(12) United States Patent
Chen

(10) Patent No.: US 8,559,763 B2
(45) Date of Patent: Oct. 15, 2013

(54) METHOD AND APPARATUS FOR MOTION-COMPENSATED INTERPOLATION (MCI) WITH CONSERVATIVE MOTION MODEL

(75) Inventor: Wei Chen, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 145 days.

(21) Appl. No.: 13/323,935

(22) Filed: Dec. 13, 2011

(65) Prior Publication Data

US 2012/0147263 A1 Jun. 14, 2012

Related U.S. Application Data

(60) Provisional application No. 61/422,758, filed on Dec. 14, 2010.

(51) Int. Cl.
*G06K 9/32* (2006.01)
*H04N 7/01* (2006.01)

(52) U.S. Cl.
USPC ............................................ 382/300; 348/452

(58) Field of Classification Search
USPC ............... 382/107, 305, 300, 312; 348/208.4, 348/452; 345/606, 664; 358/525
See application file for complete search history.

(56) References Cited

U.S. PATENT DOCUMENTS

| | | | |
|---|---|---|---|
| 6,094,232 A * | 7/2000 | Bayazit et al. ................ | 348/616 |
| 6,192,080 B1 * | 2/2001 | Sun et al. ................ | 375/240.16 |
| 6,535,647 B1 | 3/2003 | Abousleman | |
| 6,539,122 B1 | 3/2003 | Abousleman | |
| 6,658,059 B1 * | 12/2003 | Iu et al. .................... | 375/240.16 |
| 6,804,400 B1 | 10/2004 | Sharp | |
| 7,558,320 B2 * | 7/2009 | Winder et al. ........... | 375/240.12 |
| 7,587,091 B2 * | 9/2009 | Loukianov et al. .......... | 382/239 |
| 7,831,088 B2 * | 11/2010 | Frakes et al. .................. | 382/154 |
| 8,432,974 B2 | 4/2013 | Chen | |
| 2003/0021472 A1 | 1/2003 | Nichogi et al. | |
| 2006/0269140 A1 | 11/2006 | Ramsay et al. | |
| 2009/0161753 A1 | 6/2009 | Youn et al. | |
| 2011/0007819 A1 | 1/2011 | Chen | |
| 2011/0081050 A1 | 4/2011 | Chen | |
| 2012/0148110 A1 | 6/2012 | Chen | |
| 2012/0148111 A1 | 6/2012 | Chen | |
| 2012/0148112 A1 | 6/2012 | Chen | |

OTHER PUBLICATIONS

Chen, W.; Mied, R.P.; and Shen, C.Y., "Estimation of Surface Velocity from Infrared Image Using the Global Optimal Solution to an Inverse Model", Geoscience and Remote Sensing Symposium, 2008; IGARSS 2008; IEEE International; vol. 1, pp. 1-384-1-386, IEEE, 2008.

Chen, W.; Mied, R. P.; and Shen, C. Y.; "Near-Surface Ocean Velocity from Infrared Images: Global Optimal Solution to an Inverse Model", Journal of Geophysical Research—Oceans, vol. 113, C10003, pp. 1-13, (Oct. 2008).

(Continued)

*Primary Examiner* — Kanjibhai Patel
(74) *Attorney, Agent, or Firm* — US Naval Research Laboratory; Sally A. Ferrett

(57) ABSTRACT

Motion compensated interpolation (MCI) methods and apparatus are presented for constructing interpolation image frames by computing at least one interpolated motion field at a temporal interpolation time using a conservative motion equation system, and computing at least one interpolation image frame based on the computed interpolated motion field using an MCI equation system.

20 Claims, 4 Drawing Sheets

(56) References Cited

OTHER PUBLICATIONS

Emery, W.J.; Thomas, A.C.; Collins, M.J.; Crawford, W.R.; and Mackas, D.L.; "An Objective Method for Computing Advective Surface Velocities from Sequential Infrared Satellite Images", J. Geophys. Res., vol. 91, pp. 12865-12878, (1986).

Kelly, K.A., (1989), "An Inverse Model for Near-Surface Velocity from Infrared Images", J. Phys. Ocean., vol. 19, pp. 1845-1864, (1989).

Kelly, K.A.; and Strub, P.T., Comparison of Velocity Estimates from Advanced Very High-Resolution Radiometer in the Coastal Transition Zone, J. Geophys. Res., vol. 97, pp. 9653-9668, (1992).

Ostrovskii, A., and Piterbarg, L., Inversion for Heat Anomaly Transport from Sea-Surface Temperature Time-Series in the Northwest Pacific, J. Geophys. Res., vol. 100, pp. 4845-4865, (Mar. 1995).

Ostrovskii A.G., and Piterbarg L.I., "Inversion of Upper Ocean Time Series for Entrainment, Advection, and Diffusivity", J. Phys. Ocean., vol. 30, pp. 201-204, (2000).

Vigan, X.; Provost, C.; Bleck, R.; and Courtier, P.; "Sea surface velocities from sea surface temperature image sequences 1. Method and validation using primitive equation model output", J. Geophys. Res., vol. 105, pp. 19499-19514, (2000).

Vigan. X. et al., "Sea Surface Velocities from Sea Surface Temperature Image Sequences 2. Application to the Brazil-Malvinas Confluence Area", J. Geophys. Res., vol. 105, pp. 19515-19534, (2000).

Zavialov, P.O., et al., "An Inverse Model for Seasonal Circulation over the Southern Brazilian Shelf: Near-Surface Velocity from the Heat Budget," J. Phys. Ocean., vol. 28, pp. 545-562, (1998).

Chubb, S.R.; Mied, R.P.; Shen, C.Y.; Chen, W.; Evans, T.E.; and Kohut, J.; "Ocean Surface Currents from AVHRR Imagery: Comparison with Land-based HF Radar Measurements", IEEE Trans. on Geoscience and Remote Sensing, vol. 46, No. 11, pp. 3647-3660, (Nov. 2008).

Frankignoul, C. "Sea surface temperature anomalies, planetary waves, and air-sea feedback in the middle latitudes", J. Geophys. Res., vol. 23, pp. 357-390, (Nov. 1985).

Kundu, P. K., "Ekman veering observed near the ocean bottom", J. Phys. Ocean., vol. 6, pp. 238-242, (1976).

Kohut, J.T.; Glenn, S.M.; and Chant, R.J.; "Seasonal Current Variability on the New Jersey Inner Shelf", J. Geophys. Res.—Oceans, vol. 109, pp. C07S07-1-C07S07-16, (2004).

Press, W.H.; Teukolsky, S.A.; Vetterling, W.T.; and Flannery, B.P.; "Numerical Recipes in C", Cambridge University Press, 2nd Edition, pp. 123-124, (1992).

Shen, C.Y.; and Evans, T.E.; "Inertial instability and sea spirals", Geophys. Res. Lett., vol. 29, No. 23, pp. 39-1-39-4, doi: 10.1029/2002GL015701, (2002).

Shen, C.Y.; Evans, T.E.; Mied, R.P.; and Chubb, S.R.; "A velocity projection framework for inferring shallow water currents from surface tracer fields", "Cont. Shelf Research", vol. 28, pp. 849-864, 2008. (Available online Jan. 26, 2008).

Wentz, F.J.; Gentemann, C.; Smith, D.; and Chelton, D.; "Satellite measurements of sea surface temperature through clouds", Science, vol. 288, pp. 847-850, (May 2000).

Jing Zhang and Guizhong Liu, "An efficient reordering prediction-based lossless compression algorithm for hyperspectral images", Apr. 2007, IEEE Geoscience and Remote Sensing Letters, vol. 4, No. 2, pp. 283-287.

Jing Zhang and Guizhong Liu, "A novel lossless compression for hyperspectral images by adaptive classified arithmetic coding in wavelet domain", 2006, IEEE International Conference on Image Processing (ICIP), pp. 2269-2272.

Lucas, B. D.; "Generalized image matching by the method of differences", PhD thesis, Carnegie Mellon Univ., (1984).

Robbins, J.D.; Netravali A.N., "Recursive motion compensation: A review", in "Image Sequence processing and Dynamic Scene Analysis", T. S. Huang, ed., pp. 76-103, Berlin, Germany, Springer-Verlag, (1983).

Chen, W., "A Global Optimal Solution with Higher Order Continuity for the Estimation of Surface Velocity from Infrared Images", IEEE Trans. Geosci. Rem. Sens.,vol. 48, No. 4, pp. 1931-1939, (Apr. 2010).

Chen, W.; "The global optimal surface velocity field near shoreline from infrared images", International Symposium on Photoelectronic Detection and Imaging 2009: Advances in Infrared Imaging and Applications, Proc. of SPIE vol. 7383, 738333-1-738333-10, conference dates Jun. 17-19, 2009, published Aug. 4, 2009.

Chen, W., "Surface Velocity Estimation From Satellite Imagery Using Displaced Frame Central Difference Equation", IEEE Trans. Geoscience and Remote Sensing, vol. 50, No. 7, pp. 2791-2801, date of publication Jan. 23, 2012.

Chen, W.; "Nonlinear Inverse Model for Velocity Estimation from an Image Sequence", J. Geophys. Res., vol. 116, pp. C06015-1-C06015-15, Jun. 22, 2011.

Chen, W., "A Nonlinear Model for Velocity Estimation from Infrared Image Sequences", International Archives of the Photogrammetry, Remote Sensing, and Spatial Information Science (ISPRS), Commission VIII, WG VIII/9 ,vol. XXXVIII, Part 8, Kyoto, Japan, pp. 958-963, conference date Aug. 9-12, 2010.

Chen, W., "Conservative Motion Estimation from Multi-image Sequences", ISVC 2010, Proceedings Part I, Lecture Notes in Computer Science 6453, pp. 427-436, symposium date Nov. 29-Dec. 1, 2010.

Li, H.; Astrid, L.; Robert, F., "Image Sequence Coding at Very Low Bitrates: A Review"; IEEE Trans. Image Processing, vol. 3, No. 5, pp. 589-609, (Sep. 1994).

Stiller, C.; Konrad, J.; "Estimating motion in image sequences: A tutorial on modeling and computation of 2D motion", IEEE Signal Processing Magazine, pp. 70-91, (Jul. 1999).

Dubois, E., "Motion-compensated filtering of time-varying images", Multidimens. Syst. Signal Process, vol. 3, pp. 211-239, (1992).

Orchard M.T.; Sullivan, G.J.; "Overlapped block motion compensation: An estimation-theoretic approach," IEEE Trans. Image Process., vol. 3, No. 5, pp. 693-699, (Sep. 1994).

Castagno, R.; Haavisto, P.; Ramponi, G.; "A method for motion adaptive frame rate up-conversion", IEEE Trans. Circuits Syst. Video Technol., vol. 6, No. 5, pp. 436-446, (Oct. 1996).

Girod, B., "Efficiency analysis of multihypothesis motion-compensatedprediction for video coding," IEEE Trans. Image Process., vol. 9, No. 2, pp. 173-183, (Feb. 2000).

Lee, S.H.; Kwon, O.; Park, R.H.; "Weighted-adaptive motion-compensated frame rate up-conversion," IEEE Trans. Consum. Electron., vol. 49, No. 3, pp. 485-492, (Aug. 2003).

Wedi, T., "Adaptive interpolation filters and high-resolution displacements for video coding", IEEE Trans. Circuits Syst. Video Technol., vol. 16, No. 4, pp. 484-491, (2006).

Gan, Z.; Qi, L.; and Zhu, X.; "Motion compensated frame interpolation based on H.264 decoder," Electron. Lett., vol. 43, No. 1, pp. 96-98, (2007).

Choi, B.D.; Han, J.W.; Kim, C.S.; Ko, S.J.; "Motion-compensated frame interpolation using bilateral motion estimation and adaptive overlapped block motion compensation", IEEE Trans. Circuits Syst. Video Technol., vol. 17, No. 4, pp. 407-416, (2007).

Huang, A.-M.; Nguyen, T.; "A multistage motion vector processing method for motion-compensated frame interpolation," IEEE Trans. Image Process., vol. 17, No. 5, pp. 694-708, (May 2008).

Zhang, Y.; Zhao, D.; Ji, X.; Wang, R.; Gao, W.; "A Spatio-Temporal Auto Regressive Model for Frame Rate Up conversion", IEEE Trans. Circuit Syst., vol. 19, No. 9, pp. 1289-1301, (Sep. 2009).

Zhang, Y.; Zhao, D.; Ma, S.; Wang, R.; and Gao, W.; "A Motion-Aligned Auto-Regressive Model for Frame Rate Up Conversion", IEEE Transactions on Image Processing, vol. 19, No. 5, pp. 1248-1258, (May 2010).

Wang, C.; Zhang, L.; He, Y.; and Tan, Y.-P.; "Frame Rate Up-Conversion Using Trilateral Filtering", IEEE Trans. Circuit Syst., vol. 20, No. 6, pp. 886-893, (Jun. 2010).

Horn, B.; Shunck, B.; "Determining optical flow", Artificial Intelligence, No. 17, pp. 185-203, (Apr. 1980).

Bigun, J.; Granlund, G.H.; Wiklund, J.; " Multidimensional orientation estimation with applications to texture analysis and optical flow", IEEE TPAMI, (Aug. 1991).

(56) References Cited

OTHER PUBLICATIONS

Black, M.J.; Anandan, P.; "The robust estimation of multiple motions: parametric and piecewise smooth flow fields", Computer Vision and Image Understanding, vol. 63, No. 1, pp. 75-104, (1996).
Heitz, F. And Bouthemy, P., "Multimodal estimation of discontinuous optical flow using Markov random fields", IEEE Transactions on Pattern Analysis and Machine Intelligence, vol. 15, No. 12, pp. 1217-1232, (1993).
Nesi, P., "Variational approach to optical flow estimation managing discontinuities", Image and Vision Computing, vol. 11, No. 7, pp. 419-439, (1993).
Weickert, J.; Schnorr, C.; "A theoretical framework for convex regularizers in PDE-based computation of imagemotion", International Journal of Computer Vision, vol. 45, No. 3, pp. 245-264, (2001).
Bruhn, A.; Weickert, J.; Schnorr, C.; "Lucas/Kanade Meets Horn/Schunck: Combining Local and Global Optic Flow Methods", International Journal of Computer Vision, vol. 61, No. 3, pp. 211-231, (2005).
Papenberg, N.; Bruhn, A.; Brox, T.; Didas, S.; Weickert, J.; "Highly Accurate Optic Flow Computation with Theoretically Justified Warping", International Journal of Computer Vision, vol. 67, No. 2, pp. 141-158, (2006).
Glazer F., et al., "Scene matching by hierarchical correlation," Proc. IEEE Comp. Vision Pattern Recognition Conf., (Washington, DC), DTIC, 10 pages, Jun. 1983.
Ghanbari, H.; Mills, M. ; "Block matching motion estimations: New results," IEEE Trans. Circuit Syst., vol. 37, pp. 649-651, 1990.
Seferidis V.; Ghanbari, M.; "General approach to block-matching motion estimation," Journal of Optical Engineering, vol. 32, pp. 1464-1474, Jul. 1993.
Shi, J.; Tomasi, C.; "Good features to track", Proc. Computer Vision and Pattern Recognition, pp. 593-600, Jun. 1994.
Baker, S.; Scharstein, D.; Lewis, J.P.; Roth, S.; Black, M.J.; Szeliski, R.; "A Database and Evaluation Methodology for Optical Flow", Int J Comput Vis, vol. 92, pp. 1-31, conference date Oct. 2007.
Brox, T.; "Highly Accurate Optic Flow Computation with Theoretically Justified Warping", International Journal of Computer Vision, vol. 67, No. 2, pp. 141-158, (2006).

\* cited by examiner

METHOD AND APPARATUS FOR MOTION-COMPENSATED INTERPOLATION (MCI) WITH CONSERVATIVE MOTION MODEL

REFERENCE TO RELATED APPLICATION

This application is a non-provisional under 35 USC 119(e) of, and claims priority to and the benefit of U.S. Provisional Patent Application Ser. No. 61/422,758, filed Dec. 14, 2010, the entirety of which is hereby incorporated by reference.

BACKGROUND

The present disclosure relates generally to image processing and more particularly to apparatus and processes for constructing interpolated image frames using input image and motion field data. Motion compensated interpolation (MCI) and motion compensated prediction (MCP) techniques are used in computer vision, remote sensing, and video compression applications. In one application, MCI and/or MCP techniques are used for frame rate up-conversion to accommodate high definition video, for example, where an input image sequence with a frame rate of 30 frames per second will be up-converted to 120 or 240 frames per second. In this application, interpolation and/or prediction formulas are used to generate intervening frames that are inserted between the original input frames. In another application, video compression involves dropping one or more frames from an original image sequence, and transmission of the retained frames along with estimated velocity field information. After transmission, the received frames and velocity information is used in conjunction with MCI and/or MCP techniques to reconstruct the dropped frames to create a reconstructed image sequence. In this regard, interpolation involves constructing and/or reconstructing one or more frames between a received pair of input frames. Motion compensated prediction involves constructing one or more frames before an initial input frame or following a final input frame. Three major factors determine the quality of frame interpolation and prediction, including the accuracy of motion estimation, dynamic motion modeling, and the use of appropriate MCI equations. Moreover, bandwidth limitations on video transmission mediums necessitate maximizing video compression ratios. Accordingly, a need remains for improved motion compensated interpolation techniques and systems by which higher compression ratios can be achieved without sacrificing the quality of the reconstructed frame sequences for video compression and/or frame rate up-conversion.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

In accordance with one or more aspects of the present disclosure, a method is provided for constructing one or more interpolation image frames in a temporal interval. The method comprises receiving input data including at least one input frame corresponding to a first time in the interval and an input motion field describing motion vectors at a second time in the temporal interval. In certain embodiments, a second input frame may be received, but the method allows interpolation image frame construction/reconstruction even if only a single input frame is received. The method further comprises computing one or more interpolated motion fields describing motion vectors at one or more corresponding temporal interpolation times in the interval based on the input motion field and on the first input frame using a conservative motion equation system. In addition, the method involves computing at least one interpolation image frame corresponding to a temporal interpolation time based on the computed interpolated motion field and on the first input frame using an MCI equation system. In certain embodiments, the input data includes only a single input frame, and the method includes computing a reference frame corresponding to a reference time in the temporal interval based on the first input frame and on the input motion field using an MCP equation system, as well as computing the interpolated motion field based on the input motion field, the first input frame and on the computed reference frame using the conservative motion equation system. In certain implementations, the conservative motion equation system includes conservative velocity constraint (CVC) equations, and the interpolated motion field computation involves solving the CVC equations using a bilinear velocity equation. In certain embodiments, moreover, the MCI equation system includes forward and/or backward interpolation equations or the average thereof, which can be solved using a bilinear intensity function.

An interpolator apparatus is provided in accordance with further aspects of the disclosure for constructing one or more interpolation image frames in a temporal interval. The apparatus includes one or more processors as well as a memory storing a conservative motion equation system and an MCI equation system. The processor is operative to receive input data including an input frame corresponding to a first time and an input motion field describing motion vectors at a second time. The processor computes an interpolated motion field describing motion vectors at a corresponding temporal interpolation time based on the input motion field and on the first input frame using a conservative motion equation system. In addition, the processor computes at least one interpolation image frame corresponding to a temporal interpolation time based on the computed interpolated motion field and on the first input frame using an MCI equation system. In certain embodiments, the input data includes only a single input frame, and the processor computes a reference frame corresponding to a reference time in the temporal interval based on the first input frame and on the input motion field using an MCP equation system, and computes the interpolated motion field based on the input motion field, the first input frame and on the computed reference frame using the conservative motion equation system. In certain implementations, the conservative motion equation system includes conservative velocity constraint (CVC) equations, and the processor computes the interpolated motion field by solving the CVC equations using a bilinear velocity equation. In certain embodiments, moreover, the MCI equation system includes forward, backward, and/or average of the forward and backward interpolation equations, which are computed by the processor using a binear intensity function.

In accordance with further aspects of the disclosure, a computer readable medium is provided with computer executable instructions for performing the disclosed motion estimation methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, as follows.

DETAILED DESCRIPTION OF THE DISCLOSURE

Figure 1A:
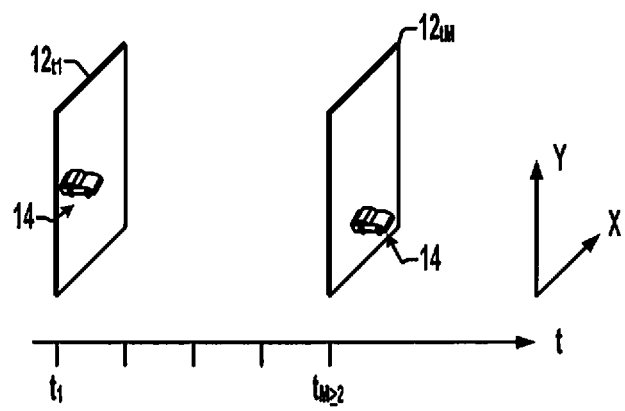
FIG. 1A is a schematic diagram illustrating an image frame pair including two image frames within a temporal interval.

One or more embodiments or implementations are hereinafter described in conjunction with the drawings, where like reference numerals refer to like elements throughout, and where the various features are not necessarily drawn to scale.

Figure 1B:
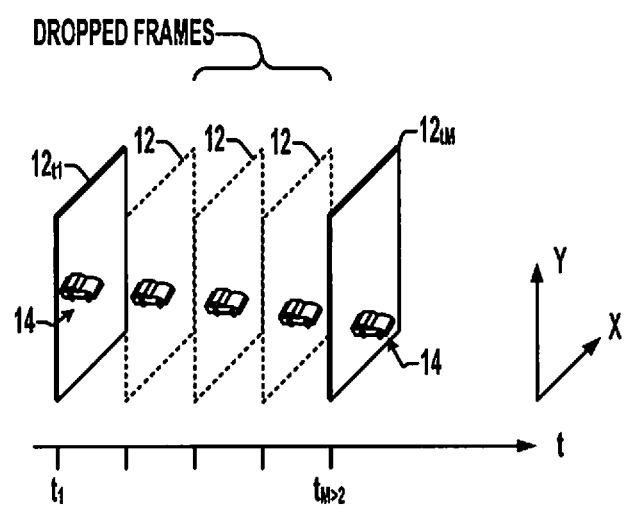
FIG. 1B is a schematic diagram illustrating a reconstructed image sequence including the input image frame pair of FIG. 1 may and a plurality of interpolated frames.

FIG. 1A illustrates an input image sequence 10 with a pair of image frames 12 including a first image frame $12_1$ and a final frame $12_M$ within a temporal interval of interest ($t_1 \leq t \leq t_M$), and FIG. 1B shows a frame rate up-converted image sequence or a reconstructed frame sequence including the first and last image frames $12_1$ and $12_M$ along with one or more intervening frames 12, referred to herein as "interpolation frames" 12. The final sequence in FIG. 1B can include any integer number M frames 12, where each individual image frame 12 includes an integer number of pixel data values, each corresponding to one or more intensity values at a two-dimensional pixel location (i, j) in an x-y plane, where each pixel location can be described are identified by an integer subscript index "i" indicating an x direction pixel index ($1 \leq i \leq I$) and an integer subscript index "j" indicating a y direction pixel index ($1 \leq j \leq J$). In the illustrated example, moreover, the image data represents optical (e.g., visible) data, such as video frames 12, where the image sequence shows a vehicle artifact 14 moving toward a lower right corner of the image frame as the sequence proceeds from an initial (e.g., first) time $t_1$ (frame $12_1$) to a final time (e.g., $t_M$ for frame $12_M$). In practice, the individual image data for a given pixel location i, j can be a single value representing light intensity (luminance) and/or an individual data point may include luminance as well as color or chrominance data values (e.g., L*a*b*, RGB, CMYK data, etc.). In other embodiments, the image sequence can include multidimensional image data representing "thermal" images, for instance, where the data values represent temperature, or other image sequences can be used in which the image intensity is recorded from physical sensors, for tracer, heat, or optical flow in space and time.

Figure 6:
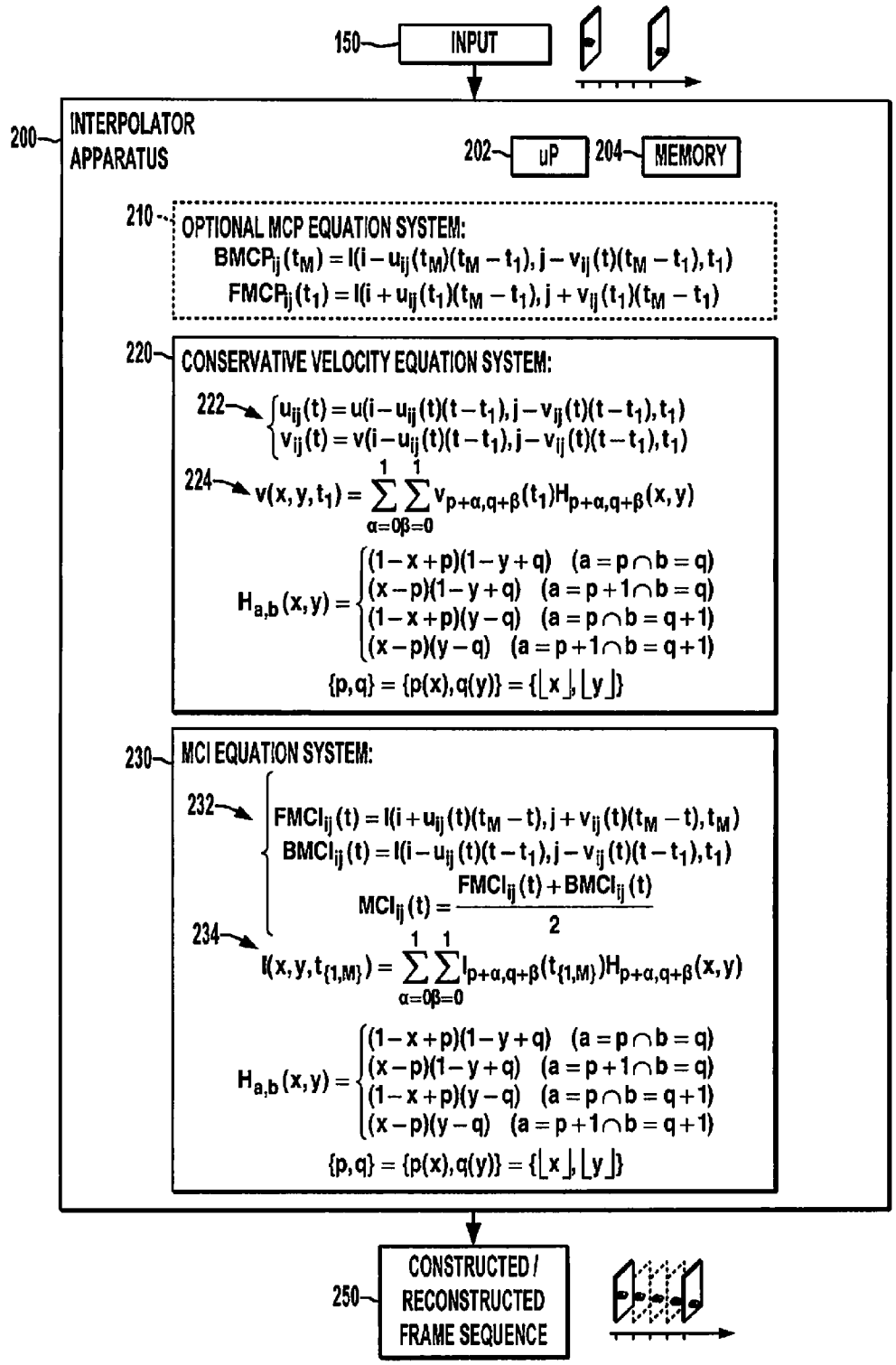
FIG. 6 is a schematic diagram illustrating an exemplary interpolator apparatus in accordance with the present disclosure.

FIG. 6 illustrates an exemplary interpolator apparatus 200 that can perform various image processing tasks including construction of one or more interpolation image frames 12 in the temporal interval $t_1 \leq t \leq t_M$. The interpolator 200 includes one or more processors 202 operatively coupled with a memory 204, and the apparatus 200 can be implemented in a single processing device or in distributed fashion across two or more processing elements 202. In the illustrated embodiment of FIG. 6, the interpolator apparatus 200 may form part of a larger system, such as a video processor coupled to a receiver for video decoding, a frame rate up-converter, etc. In operation according to certain embodiments, the interpolator apparatus 200 receives an input, such as a pair of input image frames 12 (e.g., FIG. 1A) and an input motion field, such as displacement field and/or velocity field, and computes one or more interpolation image frames 12 to provide a constructed/reconstructed image sequence such as shown in FIG. 1B for video decompression, frame rate up-conversion, etc. The apparatus 200 of FIG. 6, moreover, provides advanced video decoding by motion compensated interpolation/prediction with conservative motion modeling, and certain embodiments are operable in which only a single input frame (e.g., $12_1$ or $12_M$) and an input motion field are received. Thus, the disclosed embodiments may be successfully implemented in a manner that allows high video compression rates compared with conventional video processing techniques. In particular, certain embodiments employ a Conservative Velocity Constraint (CVC) equation, as well as an analytical recursive solution of the conservative motion model in a temporal interval with which flow fields at different times between $t_1$ and $t_M$ estimated by different methods can be mapped. The motion field used for the frame interpolation at any time t between $t_1$ and $t_M$ can be solved from the CVC equation based on the motion field at any time estimated by all reported methods. A framework for motion-compensated interpolation based on estimated optical flow field, the CVC equation, and the appropriate MCI function are described below, and implementation of the present framework can be used to achieve high fidelity interpolated motion pictures without artifact or dirty window effects, whereby the concepts of the present disclosure find particular utility in association with further developing video coding and frame rate up conversion applications.

Typical motion-compensated processing includes motion-compensated prediction (MCP), interpolation (MCI), and filtering, and video coding at very low bitrates below 64 kb/s for transmission is applicable for videophone and multimedia system applications. In order to remove temporal redundancy to achieve a minimum bit rate for video compression, MCP and MCI processing techniques may be used for interpolating intermediate frames across a long temporal range in the image sequences. Digital video format and frame rate up conversion for HDTV and multimedia systems using the MCP and MCI techniques are also becoming increasingly important. In motion-compensated compression applications, a large temporal compression ratio requires that a motion field cross several frames so that all frames except a reference frame (first or last one) can be synthesized by the MCP or MCI based on the single estimated motion field. In these applications, it is often more important that synthesized motion pictures have minimal distortion without artifact and/or dirty window effects, and is less important how well the estimated motion field agrees with the physical motion.

In the past, MCP and MCI techniques have been proposed with a wide range of computational complexities depending on the applications, and much attention has been directed to eliminating artifacts or dirty window effects along the motion trajectories in the synthesized MCI images. The interpolated frame at time $t_{1/2} \leq (t_2-t_1)/2$ is often obtained by the following conventional MCI equation (1):

$$I(i, j, t_{1/2}) = \frac{1}{2} I\left(i - \frac{\Delta x}{2}, j - \frac{\Delta y}{2}, t_1\right) + \frac{1}{2} I\left(i + \frac{\Delta x}{2}, j + \frac{\Delta y}{2}, t_2\right), \quad (1)$$

where $I(i, j, t_{1/2})$ and $\Delta r=(\Delta x, \Delta y)$ are the intensity of optical flow and the displacement vector, respectively. The inventor has appreciated that motion estimation from two successive image frames 12 provides an initial velocity field which describes spatial variations of the motion in the scene, where the dynamic motion model determines the motion field evolution versus time in a temporal interval based on the initial velocity field. In addition, the motions in the scene observed by the optical flow intensity have to be described by an appropriate equation which is employed for synthesizing the MCI images (interpolation frames).

Most MCI interpolation techniques use block-matching algorithm (BMA) for motion estimation. Recently, overlapped block motion compensation (OBMC), adaptive OBMC (AOBMC), or a bilateral motion estimation (BME) algorithms based on block-matching algorithms have been developed for improving the accuracy of the estimated flow field. Several new highly accurate and robust frameworks had been presented for motion estimation, and an alternate strategy has recently been proposed to solve the motion estimation problem. In particular, the inventor has appreciated that by dividing the image domain into many sub-images of several pixels each, the sub-images approximate the surface velocities with separate bilinear polynomials or B-splines over each sub-image. The velocity is then chosen as an optimal fit to the optical flow equation over the entire image domain, thereby providing a globally valid result, referred to as a Global Optimal Solution (GOS). A further development of the GOS by the inventor uses the displaced frame difference (DFD) equation instead of the optical flow equation employed earlier. Use of this temporal integral form of the brightness conservation constraint equation yields a higher accuracy flow field, especially for large displacement motion in image scenes. In order to provide an accurate motion field for frame rate up-conversion and video compression, an adaptive framework has been developed by the inventor to replace BMA or bilateral algorithms for motion estimation, referred to as nonlinear global optimal solution (NGOS).

The present disclosure provides a new approach and framework to improve performance of the motion-compensated prediction and interpolation. The motion vector on a fixed pixel in the interpolation formula (1) above is defined at time $t_{1/2}$ midway between the initial frame at $t_1$ and the final frame at $t_M$. To find an appropriate motion filed, the adaptive or bilateral (bidirectional) OBMC methods are employed to estimate the motion vector fields at time $t_{1/2}$. In the present disclosure, a new approach is proposed to solve the problem of the motion field at different time by different estimators. Many other factors can influence the performance of the interpolated frames such as occlusions, deformable motions, 3D motion, illumination change, camera imperfectness, etc., some of which relate to the performance of the motion estimators.

Figure 5:
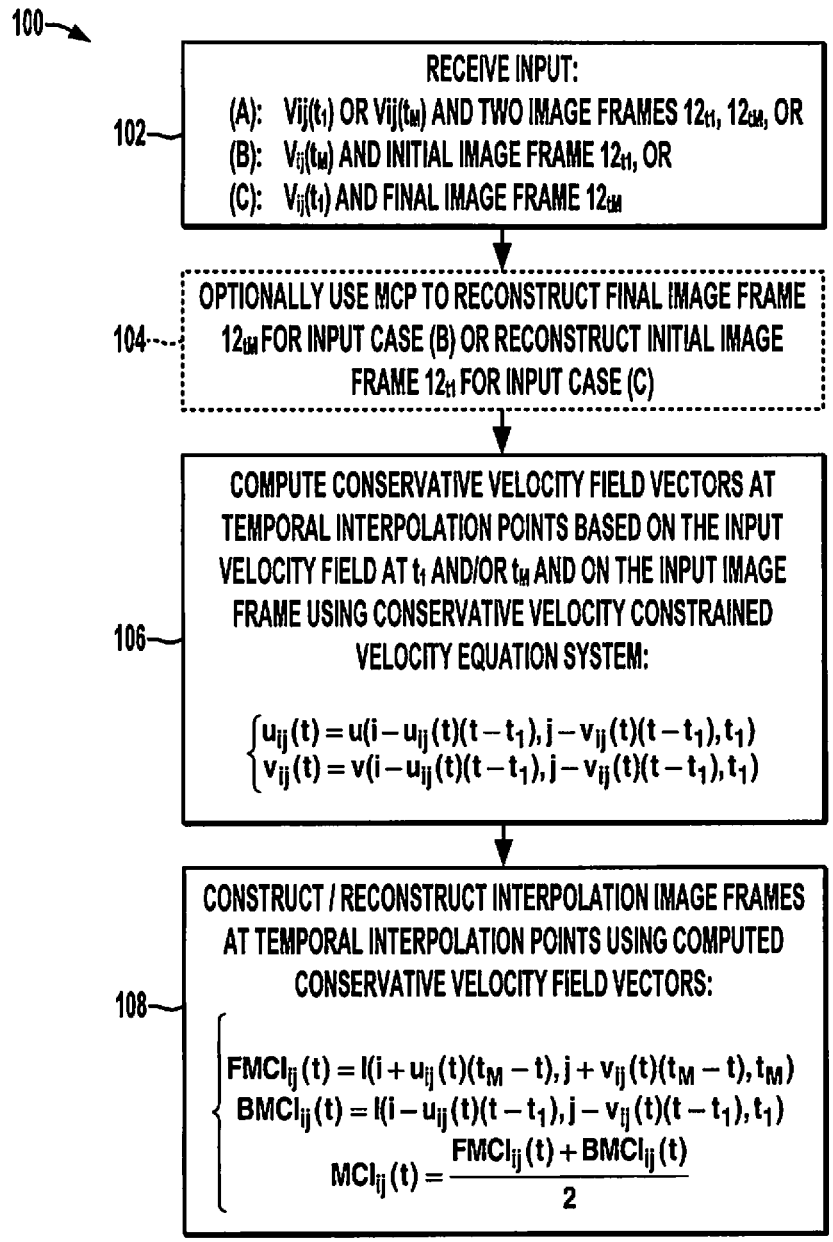
FIG. 5 is a flow diagram illustrating an exemplary method for constructing interpolation frames in accordance with further aspects of the present disclosure.

Referring to FIGS. 5 and 6, the interpolator apparatus 200 of FIG. 6 addresses frame interpolation issues associated with a physical model, and employs a conservative model approach for computing the motion compensated interpolation. In addition, various implementations provide algorithms for both MCP and MCI with this motion model. FIG. 5 illustrates an exemplary process or method 100 for constructing one or more interpolation image frames 12, where the interpolator apparatus 200 of FIG. 6 provides a processor-implemented embodiment operable in general according to the method 100.

As seen in FIG. 6, the exemplary interpolator apparatus 200 receives an input 150, and provides an output to 50 including a constructed and/or reconstructed frame sequence with two or more image frames 12. In certain embodiments, the memory 204 stores various equation systems including an optional MCP equation system 210, a conservative velocity equation system 220 and an MCI equation system 230. In certain implementations, moreover, the conservative velocity equation system includes CVC equations 222 as well is an iteration equation 224 for solving the CVC equations, and the MCI equation system can include one or more MCI equations 232 (forward and backward MCI equations 232) along with a corresponding iteration equation 234 as seen in FIG. 6.

Figure 3:
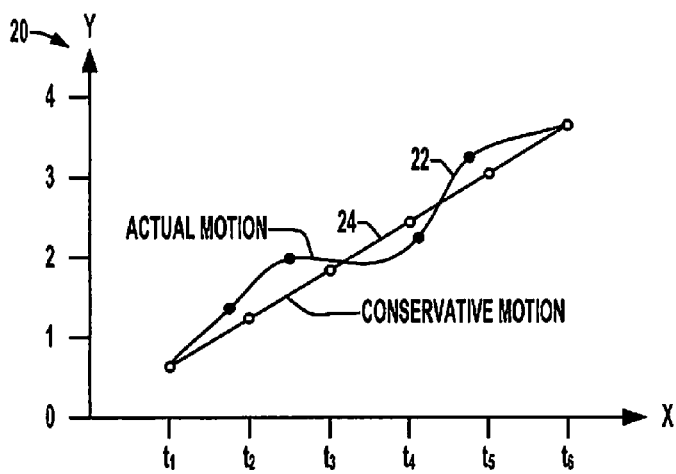
FIG. 3 is a graph illustrating an exemplary actual motion curve as well as a estimated conservative motion curve.

The process 100 of FIG. 3 includes receiving input data 150 at 102, where the input data includes at least one input frame, in this case a first input frame ($12_1$ or $12_M$) including multi-dimensional image data corresponding to a first time ($t_1$, $(t_1+t_M)/2$, or $t_M$) in the temporal interval ($t_1 \leq t \leq t_M$). In addition, the input data 150 includes an input motion field ($v_{ij}(t_1)$, $v_{ij}((t_1+t_M)/2)$, or $v_{ij}(t_M)$) describing motion vectors at pixel locations (i, j) at a time ($t_1$, $(t_1+t_M)/2$, or $t_M$) in the temporal interval ($t_1 \leq t \leq t_M$). In certain embodiments, 2 input frames 12 can be received, although not a strict requirement of all embodiments of the present disclosure. At 104 and FIG. 5, for cases in which the input data includes only a single input frame ($12_M$, and/or $12_M 12_1$), the method 100 optionally provides for computing a reference frame ($12_M$ and/or $12_1$) including multidimensional image data corresponding to a reference time ($t_M$ or $t_1$) in the temporal interval ($t_1 \leq t \leq t_M$) based on the input frame ($t_1$, $(t_1+t_M)/2$, or $t_M$) and on the input motion field ($v_{ij}(t_1)$, $v_{ij}((t_1+t_M)/2)$ or $v_{ij}(t_M)$) the MCP equation system 210. In essence, the optional processing at 104 in FIG. 5 uses motion compensated prediction to reconstruct the other reference frame that was not provided with the input 150 for the cases (B) and (C) in 102.

At 106 in FIG. 5, at least one interpolated motion field $v_{ij}(t)$ is computed (e.g., using the processor 202 in the apparatus 200 of FIG. 6) describing motion vectors at pixel locations i, j at a temporal interpolation time t in the temporal interval $t_1 \leq t \leq t_M$ based on the input motion field $v_{ij}(t_1)$, $v_{ij}((t_1+t_M)/2)$, or $v_{ij}(t_M)$ and on the first input frame $12_1$ or $12_M$ using the conservative motion equation system 220 thereafter at 108, the processor 200 to computes at least one interpolation image frame 12 including multidimensional image data corresponding to the temporal interpolation time t based on the computed interpolated motion field $v_{ij}(t)$ and on the first input frame $12_1$ and/or $12_M$ using the MCI equation system 230. In this regard, any integer number of conservative velocity fields can be computed at 106 for a corresponding integer number of temporal interpolation points, and the same number of frames 12 can be constructed/reconstructed at 108. Once these interpolation frames have been constructed of 108, the output to 50 of the interpolator apparatus 200 can be provided as a constructed/reconstructed frame sequence including the input frame(s) $12_1$ and/or $12_M$ and the interpolation frames 12 within the temporal interval $t_1 \leq t \leq t_M$ of interest.

Moreover, in cases where the input data 150 only included a single input frame ($12_1$ and/or $12_M$), the final output frame sequence to 50 can also include the reference frame constructed in the optional processing at 104 in FIG. 5. In this case, the interpolated motion field(s) are computed by the processor 202 at 106 (FIG. 5) based on the input motion field ($v_{ij}(t_1)$, $v_{ij}((t_1+t_M)/2)$, or $v_{ij}(t_M)$), the first input frame ($12_1$ and/or $12_M$), and on the computed reference frame ($12_M$ or $12_1$) using the conservative motion equation system 220.

In certain embodiments, the conservative motion equation system 220 includes conservative velocity constraint (CVC) equations (e.g., equations to 22 in FIG. 6, shown below as equation (1)):

$$\begin{cases} u_{ij}(t) = u(i - u_{ij}(t)(t - t_1),\ j - v_{ij}(t)(t - t_1),\ t_1) \\ v_{ij}(t) = v(i - u_{ij}(t)(t - t_1),\ j - v_{ij}(t)(t - t_1),\ t_1), \end{cases} \quad (1)$$

where i is a pixel index in a first direction x, j is a pixel index in a second direction y orthogonal to the first direction x, $t_1$ is the first time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction. In certain implementations, the processor 200 to computes the interpolated motion field(s) (($v_{ij}(t)$) by solving the CVC equations (1) using a damped Newton-Raphson iteration method and the following bilinear velocity equation (224 in FIG. 6):

$$v(x, y, t_1) = \sum_{\alpha=0}^{1} \sum_{\beta=0}^{1} v_{p+\alpha, q+\beta}(t_1) H_{p+\alpha, q+\beta}(x, y),$$

where $H_{a,b}(x, y)$ is given by:

$$H_{a,b}(x, y) = \begin{cases} (1 - x + p)(1 - y + q) & (a = p \cap b = q) \\ (x - p)(1 - y + q) & (a = p + 1 \cap b = q) \\ (1 - x + p)(y - q) & (a = p \cap b = q + 1) \\ (x - p)(y - q) & (a = p + 1 \cap b = q + 1), \end{cases}$$

and
where quantized indices on nodes p and q are functions of x and y and are given by:

$$\{p, q\} = \left\{ n_x \left\lfloor \frac{x}{n_x} \right\rfloor,\ n_y \left\lfloor \frac{y}{n_y} \right\rfloor \right\},$$

where $\lfloor\ \rfloor$ denotes an integer operator.

The MCI equation system (230 in FIG. 6) includes one or both of the following forward and backward interpolation equations or the average thereof (2) (232 in FIG. 6):

$$\begin{cases} FMCI_{ij}(t) = I(i + u_{ij}(t)(t_M - t),\ j + v_{ij}(t)(t_M - t),\ t_M) \\ BMCI_{ij}(t) = I(i + u_{ij}(t)(t - t_1),\ j - v_{ij}(t)(t - t_1),\ t_1) \\ MCI_{ij}(t) = \dfrac{FMCI_{ij}(t) + BMCI_{ij}(t)}{2}, \end{cases} \quad (2)$$

wherein I is an image intensity, i is a pixel index in a first direction x, j is a pixel index in a second direction y orthogonal to the first direction x, $t_1$ is the first time, $t_M$ is a reference time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direc-tion. The FMCI equation is used when the input data 150 (FIG. 6) includes the last frame ($t=t_M$) and velocity field at time $t=t_1$. Alternatively, the above BMCI equation is used when the input data 150 includes the first frame ($t=t_1$) and the velocity field at time $t=t_M$. The above MCI equation is used in cases where the input data 150 includes both frames (at $t_1$ and $t_M$) and the velocity field at either time $t=t_1$ or $t=t_M$. It is further noted that the input estimated velocity field can be at any time $t_i$, $(t_1+t_M)/2$, or $t_M$ in various embodiments.

The computation of the constructed/reconstructed interpolation frames 12 at 108 in FIG. 5 in certain embodiments involves solving the interpolation equations 232 using the following bilinear intensity function (234 in FIG. 6):

$$I(x, y, t_{[1, M]}) = \sum_{\alpha=0}^{1} \sum_{\beta=0}^{1} I_{p+\alpha, q+\beta}(t_{[1, M]}) H_{p+\alpha, q+\beta}(x, y),$$

where $H_{a,b}(x, y)$ is given by:

$$H_{a,b}(x, y) = \begin{cases} (1 - x + p)(1 - y + q) & (a = p \cap b = q) \\ (x - p)(1 - y + q) & (a = p + 1 \cap b = q) \\ (1 - x + p)(y - q) & (a = p \cap b = q + 1) \\ (x - p)(y - q) & (a = p + 1 \cap b = q + 1), \end{cases}$$

and
where quantized indices on nodes p and q are functions of x and y and are given by:

$$\{p, q\} = \left\{ n_x \left\lfloor \frac{x}{n_x} \right\rfloor,\ n_y \left\lfloor \frac{y}{n_y} \right\rfloor \right\},$$

where $\lfloor\ \rfloor$ denotes an integer operator.

Figure 2:
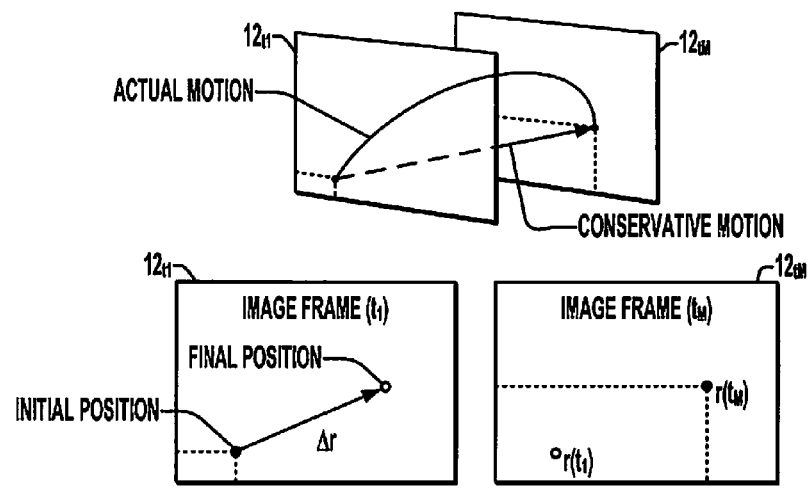
FIG. 2 is a schematic diagram illustrating an actual motion trajectory and a conservative motion computed using a conservative a velocity constraint equation in accordance with the present disclosure.
Figure 4:
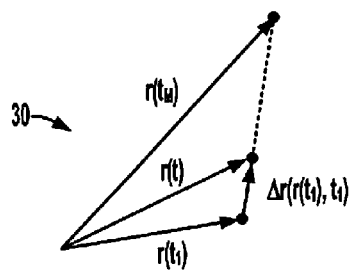
FIG. 4 is a graph illustrating exemplary displacement vectors and a corresponding velocity vector.

Referring also to FIGS. 2-4, in certain implementations the input information 150 may include two successive frames 12. As seen in FIG. 2, using this information, only a displacement between the initial and final positions ($r(t_1)$, $r(t_M)$) from the image seems can be physically observed. Thus, all information about the motion such as the change of rate and path for a particular physical particle in a scene are lost. As seen in FIG. 2, for instance, an actual motion of a particular point in an image sequence can be lost because the conservative motion only shows a direct path between the point position in the initial frame $12_{t1}$ and the final frame $12_{tM}$. As a result, the optical flow field Δr estimated by any methods from the discrete image sequence $12_{t1}$ and $12_{tM}$ is only a displacement vector field, but not an instant velocity field.

FIG. 3 shows a graph 20 with a curve 22 illustrating actual motion of a particular image point in a temporal interval between $t_t$ and $t_6$, as well as a conservative motion curve 24 showing the computed motion at temporal intermediate sampling points at time $t_2$, $t_3$, $t_4$, and $t_5$ based on an exemplary six-image sequence. As seen in FIG. 3, the use of the initial and final positions to find a physical motion curve is an ill-posed problem, since any acceleration models based on two successive frames are not meaningful because the displacement in this case can be determined only based on these given conditions.

The inventor has appreciated that a conservative motion model can be used in which all motion curves of the particles in image scenes are always collinear with the displacement line (or the conservative motion curve) between the initial and final positions with constant speeds between time $t_1$ and $t_{M=6}$ as shown in FIG. 3. A large compression ratio with high fidelity quality of interpolated motion pictures requires large scale displacement and long temporal range motion estimation for the compression of image sequences for efficient transmission. In certain embodiments, single displacement field can be estimated from the image sequence at time $t_1$ and $t_M$. Using the estimated field and the conservative motion model, all interpolation frames from $t_1$ to $t_{M-1}$ can be constructed/reconstructed by MCI/MCP based on a reference frame at $t_M$ (forward MCP and MCI), and vice versa. In this case, only one single motion field between time $t_1$ and $t_M$ and a reference frame at $t_M$ need to be transmitted or stored. This approach provides a great potential for the removal of temporal redundancy in video coding, and can greatly improve compression ratios since a second frame need not be transmitted or stored.

Any numerical acceleration models using the dropped frame information must utilize more parameters (acceleration terms) and more than two frames of information to approximate the physical motions. The cost of the extra parameters and computational complexity for the numerical acceleration models can be mitigated by the use of a conservative motion model with adjusted temporal interval (by adjusting the number of the dropped frames) as shown in FIG. 3, and this approach is concerned primarily with the accuracy of the motion-compensated interpolation regardless of the smoothness of the continuity along a motion trajectory in the application of video coding. In this regard, the conservative motion model is efficient, simplified, and accurate enough to approximate the motions based on discrete and piecewise video signals in the applications of frame rate up conversion and video compression.

Referring also to FIG. 4, the velocity vector in a traditional formula for frame interpolation is defined by the following equation:

$$v = \frac{\Delta r}{t_M - t_1},$$

where $\Delta r = r(t_M) - r(t_1)$ and $r(t)$ is a position vector and is an average (conservative) velocity. As further shown below, the inventor has derived a dynamic motion equation for solving the conservative velocity field at any time t between $t_1$ and $t_M$ at a fixed position based on the conservative motion model. The displacement vector $\Delta r$ connects the initial and final positions of a moving particle and the velocity field is the time rate of change of the displacement property with respect to specific particles of a moving continuum. A displacement vector $\Delta r(r(t_1), t_1)$ between the initial position $r(t_1)$ and interpolation position $r(t)$ on the image scenes at time $t_1$ and $t_M$ is shown in FIG. 4.

The inventor has further appreciated that if a velocity between $t_1$ and $t_M$ is conserved, the velocity at any time t between $t_1$ and $t_M$ at position $r(t)$ satisfies the following Conservative Velocity Constraint (CVC) equations (3) or (4):

$$v(r(t),t) = v(r(t) - v(r(t),t)(t-t_1), t_1) \; \forall t \in [t_1, t_M], \quad (3)$$

or $$v(r(t_1)) + v(r(t_1)(t-t_1), t_1) \Delta t, t) = v(r(t_1), t_1) \; \forall t \in [t_1, t_M], \quad (4)$$

where $v(r(t_1), t_1)$ is the initial velocity field at position $r(t_1)$. The CVC equations establish an implicit recursive function relationship between the conservative velocity fields at time $t_1$ and t. The velocity fields at time t and $t_1$ are not equal in same position, but both fields have a shift from each other for moving objects. The shift vector is the displacement vector for the time differences. Since CVC equation (3) or (4) is a vector equation, the total number of component equations is equal to the number of dimensions of the velocity. If one field is given or solved, then another corresponding field can be determined by the CVC equation (3) or (4) completely.

The inventor has further appreciated that MCI formulas can be derived based on the brightness conservation constraint and the conservative motion model. In this respect, if a displacement or its equivalent conservative velocity $v(r(t_1), t_1)$ field at time $t_1$ is given or estimated from two successive frames at time $t_1$ and $t_M$, the backward and forward motion-compensated interpolations at time t between time $t_1$ and $t_M$ in a brightness conservation constraint system are given by the following equations (5) and (6):

$$BMCI(r(t), t) = I(r(t) - v(r(t), t)(t-t_1), t_1), \quad (5)$$

$$FMCI(r(t), t) = I(r(t) + v(r(t), t)(t_M - t), t_M), \quad (6)$$

or $$MCI(r(t), t) = \frac{FMCI(r(t), t) + BMCI(r(t), t)}{2}, \quad (7)$$

where time $t \in [t_1, t_{M>1}]$, and velocity $v(r(t), t)$ is a function of the initial velocity $v(r(t_1), t_1)$ and satisfies the implicit recursive CVC equations (3) or (4).

If a function with discrete variables i and j is denoted by $f_{ij}(t) = f(i, j, t)$, the FMCI and BMCI on a pixel point $r(t) = (i, j)$ are given by the above equations (2), where $u_{ij}(t) = u(i, j, t)$ and $v_{ij}(t) = v(i, j, t)$ are two components of the conservative velocities on fixed pixel points at any time t between time $t_1$ and $t_{M>1}$. One of the two-component CVC equations at a fixed pixel position $(x(t)=i$ and $y(t)=j)$ are given by equation (1) above. The conservative velocity field $v_{ij}(t)$ at any time t between $t_1$ and $t_{M>1}$ can be solved from the CVC equation in (3) or (4) if the initial velocity field at time $t_1$ is given or estimated. In special cases, for example, when time t is equal to $t_1$ or $t_M$ in the first or second equation (2), respectively, then the FMCI and BMCI become the forward and backward motion-compensated predictions (FMCP and BMCP). The average of FMCI and BMCI is defined by MCI in this paper.

It is noted that the velocity field $v_{ij}(t)$ is not equal to $v_{ij}(t_1)$ in equation (2) even though it satisfies the CVC equations (1). The traditional formula (1) above uses the velocity field $v_{ij}(t_1)$ estimated by the BMA or OBMC to replace $v_{ij}(t)$ in equation (2). The reconstructed MCI (or bi-direction MCI) images may be contaminated by artifacts and dirty window effects along the motion trajectory.

In general, all estimated flow fields v at different times between $t_1$ and $t_M$ can be mapped using the CVC equation (3) or (4). Therefore, the flow fields estimated by the OBMA, AOBMA, and BME methods are equivalent if the implementation details are omitted. The flow field at any time t between $t_1$ and $t_M$ in the MCI formulas (2) can be solved from either one of the flow fields at time $t_1$, $t_h$($t_h = (t_1 + t_M)/2$), or $t_M$.

The motion field for the frame interpolation equation (2) can be solved from the estimated motion field at time $t_1$ by equation (1). Using the estimated motion field at time $t_h$, the motion field at any time t between $t_1$ and $t_M$ for the MCI equation (2) can be obtained from the following equations $$\begin{cases} u_{ij}(t) = u(i - u_{ij}(t)(t-t_h),\ j - v_{ij}(t)(t-t_h),\ t_h) \\ v_{ij}(t) = v(i - u_{ij}(t)(t-t_h),\ j - v_{ij}(t)(t-t_h),\ t_h). \end{cases}$$

The inventor has developed an MCI framework using the MCP and MCI techniques based on the conservative motion model, in which input information 150 can be an image sequence at time $t_1$ and $t_M$. A flow field is first estimated by a motion estimator from the image sequence. Using the CVC equation based on the estimated flow field at time $t_1$, the conservative velocity field for frame interpolation at any time t between $t_1$ and $t_M$ can be solved. A synthesized frame 12$_{t1}$ at initial time $t_1$ can be reconstructed by the MCP and the initial velocity field using last image as a reference frame. All intermediate frames at time t between the first and the last frames 12$_{t1}$ and 12$_{tM}$ can be reconstructed by the MCI equation (2) with the velocity field at time t.

The first step in the MCI procedures is the velocity field estimation from an image sequence. To obtain higher accuracy in velocity estimation, especially for larger scale displacement motion, the differential form of the conservation constraint (optical flow) equation is replaced by a temporal integral form of the conservation constraint (displaced frame difference) equation. The inventor has developed an adaptive framework for solving the nonlinear system based on the displaced frame difference (DFD) equation, velocity field modeling, nonlinear least-squares model, and Gauss-Newton and Levenberg-Marquardt algorithms. An algorithm of the progressive relaxation of over-constraint can be used for seeking a flow field in which each vector is consistent with its neighbors. One advantage of the NGOS approach is that the adjustable block size approach using smaller number of velocity vectors on nodes to generate full dense velocity field provide a powerful capability for motion-compensated compression. If the block size is n×n with dimension $N_x \times N_y$ images, then the number of transmitted or stored motion vectors for both NGOS and BMA estimators are equal to $[(N_x-1)/n+1] \times [(N_y-1)/n+1]$ and $(N_x/n) \times (N_y/n)$, respectively. Using almost the same number of displacement vectors in a fixed block size for both approaches, the NGOS method (the motion field with $C^1$ continuity obtained by global optimal strategies) can provide much higher accurate performance than the BMA (the motion field with $C^0$ continuity obtained by local searching strategies) which is the currently adopted standard for video coding.

Before applying the MCI formula (2) to reconstruct the interpolation frames, all conservative velocity fields at the temporal interpolation points are obtained (e.g., at 106 in FIG. 5 above). The CVC equation (1) indicates that the conservative velocity field at any time $t \in [t_1, t_{M>1}]$ can be determined by the given initial velocity field. In certain embodiments, a numerical method can be used to solve the conservative velocity field at any time t between time $t_1$ and $t_M$, when the initial velocity field $v_{ij}(t_1)$ is given. Since equations (1) are nonlinear implicit recursive functions with variables $u_{ij}(t)$ and $v_{ij}(t)$, the system of equations can be solved by damped Newton-Raphson method. An analytical function of $v(x, y, t_1)$ at any position using the given or solved discrete velocity field $v_{ij}(t_1)$ on pixels is expressed by the following bilinear form:

$$v(x, y, t_1) = \sum_{\alpha=0}^{1} \sum_{\beta=0}^{1} v_{p+\alpha, q+\beta}(t_1) H_{p+\alpha, q+\beta}(x, y),$$

where function $H_{a,b}(x, y)$ is defined by $$H_{a,b}(x, y) = \begin{cases} (1-x+p)(1-y+q) & (a = p \cap b = q) \\ (x-p)(1-y+q) & (a = p+1 \cap b = q) \\ (1-x+p)(y-q) & (a = p \cap b = q+1) \\ (x-p)(y-q) & (a = p+1 \cap b = q+1). \end{cases}$$

The quantized indices p and q are functions of x and y and are given by the following formula:

$$\{p,q\} = \{p(x), q(y)\} = \{\lfloor x \rfloor, \lfloor y \rfloor\}.$$

where $\lfloor \ \rfloor$ denotes an integer operator. The $\{p, q\}$ serve as pixel indices. The values and derivatives of the error functions in equation (1) can be evaluated with respect to $u_{ij}(t)$ and $v_{ij}(t)$. Since both indexes p and q in the above bilinear form are functions of the variables $u_{ij}(t)$ and $v_{ij}(t)$, the variables $u_{ij}(t)$ and $v_{ij}(t)$ cannot be solved directly, but these equations are quasi-quadratic and can therefore be solved by the damped Newton-Raphson method.

All derivatives of equations (1) with respect to variables $u_{ij}(t)$ and $v_{ij}(t)$ can be evaluated by the analytical functions. Two index variables $p=p(i-u_{ij}(t)(t-t_1))$ and $q=q(j-v_{ij}(t)(t-t_1))$ are integer functions of the variables $u_{ij}(t)$ and $v_{ij}(t)$, but the derivative of the integer functions are equal to zero using limit theory:

$$\begin{cases} \dfrac{\partial u_{pq}(t_1)}{\partial u_{ij}} = \dfrac{\partial u_{pq}(t_1)}{\partial v_{ij}} \equiv 0 \\ \dfrac{\partial v_{pq}(t_1)}{\partial u_{ij}(t)} = \dfrac{\partial v_{pq}(t_1)}{\partial v_{ij}(t)} \equiv 0. \end{cases}$$

In practice, the velocity field at time t can be solved from equations (1) by only a few iteration steps (quick convergence), because these equations are quasi-quadratic for this velocity model.

The forward and backward MCI functions (2) with variables that are out of the position on pixels in an image can be evaluated by a bilinear intensity function given by:

$$I(x, y, t_{\{1,M\}}) = \sum_{\alpha=0}^{1} \sum_{\beta=0}^{1} I_{p+\alpha, q+\beta}(t_{\{1,M\}}) H_{p+\alpha, q+\beta}(x, y),$$

where the quantized indices p, q, and function $H_{a,b}(x, y)$ are defined above.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or The following is claimed:

1. A method for constructing one or more interpolation image frames in a temporal interval, the method comprising:
   receiving input data including:
      a first input frame including multidimensional image data corresponding to a first time in the temporal interval, and
      an input motion field describing motion vectors at pixel locations at a second time in the temporal interval;
   using at least one processor, computing at least one interpolated motion field describing motion vectors at pixel locations at a temporal interpolation time in the temporal interval based on the input motion field and on the first input frame using a conservative motion equation system; and
   using the at least one processor, computing at least one interpolation image frame including multidimensional image data corresponding to the temporal interpolation time in the temporal interval based on the computed interpolated motion field and on the first input frame using a motion compensated interpolation (MCI) equation system.

2. The method of claim 1, wherein the input data includes only a single input frame, the method further comprising:
   computing a reference frame including multidimensional image data corresponding to a reference time in the temporal interval based on the first input frame and on the input motion field using a motion compensated prediction (MCP) equation system; and
   computing the at least one interpolated motion field based on the input motion field, the first input frame, and on the computed reference frame using the conservative motion equation system.

3. The method of claim 1, wherein the conservative motion equation system includes conservative velocity constraint (CVC) equations given by:

$$\begin{cases} u_{ij}(t) = u(i - u_{ij}(t)(t - t_1), j - v_{ij}(t)(t - t_1), t_1) \\ v_{ij}(t) = v(i - u_{ij}(t)(t - t_1), j - v_{ij}(t)(t - t_1), t_1), \end{cases}$$

where i is a pixel index in a first direction x, j is a pixel index in a second direction y orthogonal to the first direction x, $t_1$ is the first time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

4. The method of claim 3, wherein computing the at least one interpolated motion field comprises solving the CVC equations using the following bilinear velocity equation:

$$v(x, y, t_1) = \sum_{\alpha=0}^{1} \sum_{\beta=0}^{1} v_{p+\alpha, q+\beta}(t_1) H_{p+\alpha, q+\beta}(x, y),$$

where $H_{a,b}(x, y)$ is given by:

$$H_{a,b}(x, y) = \begin{cases} (1 - x + p)(1 - y + q) & (a = p \cap b = q) \\ (x - p)(1 - y + q) & (a = p + 1 \cap b = q) \\ (1 - x + p)(y - q) & (a = p \cap b = q + 1) \\ (x - p)(y - q) & (a = p + 1 \cap b = q + 1), \end{cases}$$

and where quantized indices on nodes p and q are functions of x and y and are given by:

$$\{p, q\} = \left\{ n_x \left\lfloor \frac{x}{n_x} \right\rfloor, n_y \left\lfloor \frac{y}{n_y} \right\rfloor \right\},$$

where $\lfloor \ \rfloor$ denotes an integer operator.

5. The method of claim 1, wherein the MCI equation system includes at least one of the following interpolation equations:

$$\begin{cases} FMCI_{ij}(t) = I(i + u_{ij}(t)(t_M - t), j + v_{ij}(t)(t_M - t), t_M) \\ BMCI_{ij}(t) = I(i - u_{ij}(t)(t - t_1), j - v_{ij}(t)(t - t_1), t_1) \\ MCI_{ij}(t) = \dfrac{FMCI_{ij}(t) + BMCI_{ij}(t)}{2}, \end{cases}$$

wherein I is an image intensity, i is a pixel index in a first direction x, j is a pixel index in a second direction y orthogonal to the first direction x, $t_1$ is the first time, $t_M$ is a reference time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

6. The method of claim 5, wherein computing at least one interpolation image frame comprises solving the interpolation equations using the following iteration equation:

$$I(x, y, t_{[1,M]}) = \sum_{\alpha=0}^{1} \sum_{\beta=0}^{1} I_{p+\alpha, q+\beta}(t_{[1,M]}) H_{p+\alpha, q+\beta}(x, y),$$

where $H_{a,b}(x, y)$ is given by:

$$H_{a,b}(x, y) = \begin{cases} (1 - x + p)(1 - y + q) & (a = p \cap b = q) \\ (x - p)(1 - y + q) & (a = p + 1 \cap b = q) \\ (1 - x + p)(y - q) & (a = p \cap b = q + 1) \\ (x - p)(y - q) & (a = p + 1 \cap b = q + 1), \end{cases}$$

and where quantized indices on nodes p and q are functions of x and y and are given by:

$$\{p, q\} = \left\{ n_x \left\lfloor \frac{x}{n_x} \right\rfloor, n_y \left\lfloor \frac{y}{n_y} \right\rfloor \right\},$$

where $\lfloor \ \rfloor$ denotes an integer operator.

7. The method of claim 6, wherein the conservative motion equation system includes conservative velocity constraint (CVC) equations given by:

$$\begin{cases} u_{ij}(t) = u(i - u_{ij}(t)(t - t_1), j - v_{ij}(t)(t - t_1), t_1) \\ v_{ij}(t) = v(i - u_{ij}(t)(t - t_1), j - v_{ij}(t)(t - t_1), t_1), \end{cases}$$

where i is a pixel index in a first direction x, j is a pixel index in a second direction y orthogonal to the first direction x, $t_1$ is the first time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

8. The method of claim 7, wherein computing the at least one interpolated motion field comprises solving the CVC equations using the following bilinear velocity equation:

$$v(x, y, t_1) = \sum_{\alpha=0}^{1} \sum_{\beta=0}^{1} v_{p+\alpha, q+\beta}(t_1) H_{p+\alpha, q+\beta}(x, y),$$

where $H_{a,b}(x, y)$ is given by:

$$H_{a,b}(x, y) = \begin{cases} (1-x+p)(1-y+q) & (a = p \cap b = q) \\ (x-p)(1-y+q) & (a = p+1 \cap b = q) \\ (1-x+p)(y-q) & (a = p \cap b = q+1) \\ (x-p)(y-q) & (a = p+1 \cap b = q+1), \end{cases}$$

and
where quantized indices on nodes p and q are functions of x and y and are given by:

$$\{p, q\} = \left\{ n_x \left\lfloor \frac{x}{n_x} \right\rfloor, n_y \left\lfloor \frac{y}{n_y} \right\rfloor \right\},$$

where $\lfloor \; \rfloor$ denotes an integer operator.

9. An interpolator apparatus for constructing one or more interpolation image frames in a temporal interval, comprising:
at least one processor; and
a memory storing a conservative motion equation system, and a motion compensated interpolation (MCI) equation system;
the at least one processor operative to receive input data including:
a first input frame including multidimensional image data corresponding to a first time in the temporal interval, and
an input motion field describing motion vectors at pixel locations at a second time in the temporal interval;
the at least one processor operative to compute at least one interpolated motion field describing motion vectors at pixel locations at a temporal interpolation time in the temporal interval based on the input motion field and on the first input frame using a conservative motion equation system; and
the at least one processor operative to compute at least one interpolation image frame including multidimensional image data corresponding to the temporal interpolation time in the temporal interval based on the computed interpolated motion field and on the first input frame using a motion compensated interpolation (MCI) equation system.

10. The interpolator apparatus of claim 9, wherein the input data includes only a single input frame;
wherein the at least one processor is operative to compute a reference frame including multidimensional image data corresponding to a reference time in the temporal interval based on the first input frame and on the input motion field using a motion compensated prediction (MCP) equation system; and
wherein the at least one processor is operative to compute the at least one interpolated motion field based on the input motion field, the first input frame, and on the computed reference frame using the conservative motion equation system.

11. The interpolator apparatus of claim 9, wherein the conservative motion equation system includes conservative velocity constraint (CVC) equations given by:

$$\begin{cases} u_{ij}(t) = u(i - u_{ij}(t)(t - t_1), j - v_{ij}(t)(t - t_1), t_1) \\ v_{ij}(t) = v(i - u_{ij}(t)(t - t_1), j - v_{ij}(t)(t - t_1), t_1), \end{cases}$$

where i is a pixel index in a first direction x, j is a pixel index in a second direction y orthogonal to the first direction x, $t_1$ is the first time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

12. The interpolator apparatus of claim 11, wherein the at least one processor is operative to compute the at least one interpolated motion field by solving the CVC equations using the following bilinear velocity equation:

$$v(x, y, t_1) = \sum_{\alpha=0}^{1} \sum_{\beta=0}^{1} v_{p+\alpha, q+\beta}(t_1) H_{p+\alpha, q+\beta}(x, y),$$

where $H_{a,b}(x, y)$ is given by:

$$H_{a,b}(x, y) = \begin{cases} (1-x+p)(1-y+q) & (a = p \cap b = q) \\ (x-p)(1-y+q) & (a = p+1 \cap b = q) \\ (1-x+p)(y-q) & (a = p \cap b = q+1) \\ (x-p)(y-q) & (a = p+1 \cap b = q+1), \end{cases}$$

and
where quantized indices on nodes p and q are functions of x and y and are given by:

$$\{p, q\} = \left\{ n_x \left\lfloor \frac{x}{n_x} \right\rfloor, n_y \left\lfloor \frac{y}{n_y} \right\rfloor \right\},$$

where $\lfloor \; \rfloor$ denotes an integer operator.

13. The interpolator apparatus of claim 9, wherein the MCI equation system includes at least one of the following interpolation equations:

$$\begin{cases} FMCI_{ij}(t) = I(i + u_{ij}(t)(t_M - t), j + v_{ij}(t)(t_M - t), t_M) \\ BMCI_{ij}(t) = I(i - u_{ij}(t)(t - t_1), j - v_{ij}(t)(t - t_1), t_1) \\ MCI_{ij}(t) = \dfrac{FMCI_{ij}(t) + BMCI_{ij}(t)}{2}, \end{cases}$$

wherein I is an image intensity, i is a pixel index in a first direction x, j is a pixel index in a second direction y orthogonal to the first direction x, $t_1$ is the first time, $t_M$ is a reference time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

14. The interpolator apparatus of claim 13, wherein the at least one processor is operative to compute at least one interpolation image frame by solving the interpolation equations using the following iteration equation:

$$I(x, y, t_{[1,M]}) = \sum_{\alpha=0}^{1} \sum_{\beta=0}^{1} I_{p+\alpha,q+\beta}(t_{[1,M]}) H_{p+\alpha,q+\beta}(x, y),$$

where $H_{a,b}(x, y)$ is given by:

$$H_{a,b}(x, y) = \begin{cases} (1 - x + p)(1 - y + q) & (a = p \cap b = q) \\ (x - p)(1 - y + q) & (a = p + 1 \cap b = q) \\ (1 - x + p)(y - q) & (a = p \cap b = q + 1) \\ (x - p)(y - q) & (a = p + 1 \cap b = q + 1), \end{cases}$$

and where quantized indices on nodes p and q are functions of x and y and are given by:

$$\{p, q\} = \left\{ n_x \left\lfloor \dfrac{x}{n_x} \right\rfloor, n_y \left\lfloor \dfrac{y}{n_y} \right\rfloor \right\},$$

where $\lfloor \ \rfloor$ denotes an integer operator.

15. The interpolator apparatus of claim 14, wherein the conservative motion equation system includes conservative velocity constraint (CVC) equations given by:

$$\begin{cases} u_{ij}(t) = u(i - u_{ij}(t)(t - t_1), j - v_{ij}(t)(t - t_1), t_1) \\ v_{ij}(t) = v(i - u_{ij}(t)(t - t_1), j - v_{ij}(t)(t - t_1), t_1), \end{cases}$$

where i is a pixel index in a first direction x, j is a pixel index in a second direction y orthogonal to the first direction x, $t_1$ is the first time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

16. The interpolator apparatus of claim 15, wherein the at least one processor is operative to compute the at least one interpolated motion field by solving the CVC equations using the following bilinear velocity equation:

$$v(x, y, t_1) = \sum_{\alpha=0}^{1} \sum_{\beta=0}^{1} v_{p+\alpha,q+\beta}(t_1) H_{p+\alpha,q+\beta}(x, y),$$

where $H_{a,b}(x, y)$ is given by:

$$H_{a,b}(x, y) = \begin{cases} (1 - x + p)(1 - y + q) & (a = p \cap b = q) \\ (x - p)(1 - y + q) & (a = p + 1 \cap b = q) \\ (1 - x + p)(y - q) & (a = p \cap b = q + 1) \\ (x - p)(y - q) & (a = p + 1 \cap b = q + 1), \end{cases}$$

and where quantized indices on nodes p and q are functions of x and y and are given by:

$$\{p, q\} = \left\{ n_x \left\lfloor \dfrac{x}{n_x} \right\rfloor, n_y \left\lfloor \dfrac{y}{n_y} \right\rfloor \right\},$$

where $\lfloor \ \rfloor$ denotes an integer operator.

17. A non-transitory computer readable storage medium with computer executable instructions for constructing one or more interpolation image frames in a temporal interval, the computer readable medium comprising computer executable instructions for:

receiving input data including:
  a first input frame including multidimensional image data corresponding to a first time in the temporal interval, and
  an input motion field describing motion vectors at pixel locations at a second time in the temporal interval;

using at least one processor, computing at least one interpolated motion field describing motion vectors at pixel locations at a temporal interpolation time in the temporal interval based on the input motion field and on the first input frame using a conservative motion equation system; and using the at least one processor, computing at least one interpolation image frame including multidimensional image data corresponding to the temporal interpolation time in the temporal interval based on the computed interpolated motion field and on the first input frame using a motion compensated interpolation (MCI) equation system.

18. The non-transitory computer readable storage medium of claim 17, wherein the input data includes only a single input frame, comprising computer executable instructions for:

computing a reference frame including multidimensional image data corresponding to a reference time in the temporal interval based on the first input frame and on the input motion field using a motion compensated prediction (MCP) equation system; and computing the at least one interpolated motion field based on the input motion field, the first input frame, and on the computed reference frame using the conservative motion equation system.

19. The non-transitory computer readable storage medium of claim 17, wherein the conservative motion equation system includes conservative velocity constraint (CVC) equations given by:

$$\begin{cases} u_{ij}(t) = u(i - u_{ij}(t)(t-t_1),\ j - v_{ij}(t)(t-t_1),\ t_1) \\ v_{ij}(t) = v(i - u_{ij}(t)(t-t_1),\ j - v_{ij}(t)(t-t_1),\ t_1), \end{cases}$$

where i is a pixel index in a first direction x, j is a pixel index in a second direction y orthogonal to the first direction x, $t_1$ is the first time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

20. The A non-transitory computer readable storage medium of claim 17, wherein the MCI equation system includes at least one of the following interpolation equations:

$$\begin{cases} FMCI_{ij}(t) = I(i + u_{ij}(t)(t_M - t),\ j + v_{ij}(t)(t_M - t),\ t_M) \\ BMCI_{ij}(t) = I(i - u_{ij}(t)(t-t_1),\ j - v_{ij}(t)(t-t_1),\ t_1) \\ MCI_{ij}(t) = \dfrac{FMCI_{ij}(t) + BMCI_{ij}(t)}{2}, \end{cases}$$

wherein I is an image intensity, i is a pixel index in a first direction x, j is a pixel index in a second direction y orthogonal to the first direction x, $t_1$ is the first time, $t_M$ is a reference time, t is the temporal interpolation time, $u_{ij}(t)$ is a velocity vector at pixel location ij at the temporal interpolation time in the first direction, and $v_{ij}(t)$ is a velocity vector at pixel location ij at the temporal interpolation time in the second direction.

* * * * *